(12) United States Patent
Frost et al.

(10) Patent No.: US 6,419,726 B1
(45) Date of Patent: Jul. 16, 2002

(54) FLUID SEPARATION ASSEMBLY AND FLUID SEPARATION MODULE

(75) Inventors: Chester B. Frost, Corvallis; Brett R. Krueger, Lebanon, both of OR (US)

(73) Assignee: ATI Properties, Inc., Albany, OR (US)

( * ) Notice: Subject to any disclaimer, the term of this patent is extended or adjusted under 35 U.S.C. 154(b) by 0 days.

(21) Appl. No.: 09/560,314

(22) Filed: Apr. 27, 2000

Related U.S. Application Data

(63) Continuation-in-part of application No. 09/422,505, filed on Oct. 21, 1999.

(51) Int. Cl.[7] .................................................. B01D 53/22
(52) U.S. Cl. ........................ 95/56; 96/4; 96/9; 96/11; 210/321.75
(58) Field of Search ............................ 95/55, 56; 96/4, 96/7, 9, 11; 210/321.75, 321.84

(56) References Cited

U.S. PATENT DOCUMENTS

| | | |
|---|---|---|
| 2,824,620 A | 2/1958 | De Rosset |
| 3,208,198 A | 9/1965 | Rubin |
| 3,336,730 A | 8/1967 | McBride et al. ............... 95/56 |
| 3,344,586 A * | 10/1967 | Langley et al. .................. 96/7 |
| 3,350,176 A | 10/1967 | Green et al. |
| 3,368,329 A | 2/1968 | Eguchi et al. |
| 3,398,834 A | 8/1968 | Nuttall et al. ............ 210/321.1 |
| 3,428,476 A | 2/1969 | Langley et al. |
| 3,439,474 A | 4/1969 | McKinley |
| 3,447,288 A | 6/1969 | Juda et al. |
| 3,450,500 A | 6/1969 | Setzer et al. |
| 3,469,944 A | 9/1969 | Bocard et al. |
| 3,486,301 A * | 12/1969 | Bonnet ............................ 96/7 |
| 3,520,803 A | 7/1970 | Iaconelli |
| 3,564,819 A | 2/1971 | Neulander |
| 3,665,680 A | 5/1972 | Heuser |
| 3,713,270 A | 1/1973 | Farr et al. |
| 3,761,382 A | 9/1973 | Hammond et al. |
| 3,837,146 A * | 9/1974 | Faure et al. ..................... 96/7 |
| 3,881,891 A | 5/1975 | Goltsov et al. |

(List continued on next page.)

FOREIGN PATENT DOCUMENTS

| | | | |
|---|---|---|---|
| CA | 724.479 | 12/1965 | ................... 95/55 |
| CA | 1 238 866 | 7/1988 | |
| DE | 2005494 | 9/1970 | ................... 95/56 |
| EP | 1065741 | 1/2001 | |
| GB | 2233579 | 1/1991 | ................... 96/9 |
| JP | 45-14404 | 5/1970 | |
| JP | 45-2642 | 9/1970 | |
| JP | 1-145302 | 6/1989 | |
| JP | 1-145303 | 6/1989 | |
| JP | 1-262903 | 10/1989 | |
| JP | 6-134244 | 5/1994 | |
| WO | WO 97/43796 | 11/1997 | |
| WO | WO 99/30906 | 6/1999 | |

OTHER PUBLICATIONS

English abstract of Japanese Patent No. 1–262903, 1989.
English abstract of Japanese Patent No. 432150, 1992.
English abstract of Japanese Patent No. 513230, 1993.
English abstract of Japanese Patent No. 514790, 1993.
English abstract of Japanese Patent No. 604070, 1994.
English abstract of Japanese Patent No. 634540, 1994.

(List continued on next page.)

*Primary Examiner*—Robert H. Spitzer
(74) *Attorney, Agent, or Firm*—Patrick J. Viccaro

(57) ABSTRACT

A fluid separation assembly having a fluid permeable membrane and a wire mesh membrane adjacent the fluid permeable membrane, wherein the wire mesh membrane supports the fluid permeable membrane and is coated with an intermetallic diffusion barrier. The barrier may be a thin film containing at least one of a nitride, oxide, boride, silicide, carbide and aluminide. Several fluid separation assemblies can be used in a module to separate hydrogen from a gas mixture containing hydrogen.

43 Claims, 10 Drawing Sheets

U.S. PATENT DOCUMENTS

| | | | |
|---|---|---|---|
| 3,881,897 A | * 5/1975 | Faure et al. ............... 96/9 |
| 3,972,695 A | 8/1976 | Buckley et al. |
| 4,003,725 A | 1/1977 | Bunn, Jr. et al. |
| 4,056,373 A | 11/1977 | Rubin |
| 4,132,668 A | 1/1979 | Gryaznov et al. |
| 4,238,403 A | 12/1980 | Pinto |
| 4,239,728 A | * 12/1980 | Stenberg et al. ........... 96/7 X |
| 4,243,536 A | 1/1981 | Prölss ............... 210/321.1 |
| 4,248,688 A | 2/1981 | Gartner et al. |
| 4,254,086 A | * 3/1981 | Sanders ............... 95/56 X |
| 4,319,923 A | 3/1982 | Falanga et al. |
| 4,331,520 A | 5/1982 | Juda et al. |
| 4,422,911 A | 12/1983 | Juda et al. |
| 4,468,235 A | 8/1984 | Hill |
| 4,472,176 A | 9/1984 | Rubin |
| 4,589,891 A | 5/1986 | Iniotakis et al. |
| 4,597,868 A | 7/1986 | Watanabe ............... 210/232 |
| 4,613,436 A | * 9/1986 | Wight et al. ............ 96/7 X |
| 4,655,797 A | 4/1987 | Iniotakis et al. |
| 4,699,637 A | 10/1987 | Iniotakis et al. ........... 55/158 |
| 4,713,234 A | 12/1987 | Weirich et al. |
| 4,810,485 A | 3/1989 | Marianowski et al. |
| 4,849,187 A | 7/1989 | Uozu et al. |
| 4,981,676 A | 1/1991 | Minet et al. |
| 4,999,107 A | * 3/1991 | Guerif ............... 96/7 X |
| 5,126,045 A | 6/1992 | Kohlheb et al. ........ 210/321.85 |
| 5,139,541 A | 8/1992 | Edlund |
| 5,158,581 A | 10/1992 | Coplan |
| 5,205,841 A | 4/1993 | Vaiman |
| 5,215,729 A | 6/1993 | Buxbaum |
| 5,217,506 A | 6/1993 | Edlund et al. ........... 55/16 |
| 5,225,080 A | * 7/1993 | Karbachsch et al. ........ 96/4 X |
| 5,229,102 A | 7/1993 | Minet et al. |
| 5,259,870 A | 11/1993 | Edlund ............... 95/56 |
| 5,269,917 A | 12/1993 | Stankowski ............ 210/232 |
| 5,326,550 A | 7/1994 | Adris et al. |
| 5,354,547 A | 10/1994 | Rao et al. |
| 5,376,167 A | 12/1994 | Broutin et al. |
| 5,393,325 A | 2/1995 | Edlund |
| 5,449,848 A | 9/1995 | Itoh |
| 5,486,475 A | 1/1996 | Kramer et al. |
| 5,498,278 A | 3/1996 | Edlund et al. ........... 48/76 |
| 5,500,122 A | 3/1996 | Schwartz |
| 5,518,530 A | 5/1996 | Sakai et al. |
| 5,520,807 A | 5/1996 | Myrna et al. |
| 5,525,322 A | 6/1996 | Willms |
| 5,536,405 A | * 7/1996 | Myrna et al. ........... 96/7 X |
| 5,639,431 A | 6/1997 | Shirasaki et al. |
| 5,645,626 A | 7/1997 | Edlund et al. ........... 95/56 |
| 5,734,092 A | 3/1998 | Wang et al. |
| 5,738,708 A | 4/1998 | Peachey et al. |
| 5,782,960 A | 7/1998 | Ogawa et al. |
| 5,821,185 A | 10/1998 | White et al. |
| 5,858,314 A | 1/1999 | Hsu et al. |
| 5,861,137 A | 1/1999 | Edlund |
| 5,888,273 A | 3/1999 | Buxbaum |
| 5,891,222 A | * 4/1999 | Hilgendorff et al. ........... 96/7 |
| 5,904,754 A | 5/1999 | Juda et al. |
| 5,938,800 A | 8/1999 | Verrill et al. |
| 5,965,010 A | 10/1999 | Bloomfield et al. |
| 5,997,594 A | * 12/1999 | Edlund et al. ........... 96/7 X |
| 6,103,028 A | 8/2000 | Juda et al. |
| 6,152,995 A | 11/2000 | Edlund |
| 6,171,574 B1 | 1/2001 | Juda et al. |
| 6,221,117 B1 | 4/2001 | Edlund et al. |
| 6,238,465 B1 | 5/2001 | Juda et al. |

OTHER PUBLICATIONS

English abstract of Japanese Patent No. 710910, 1995.

English abstract of Japanese Patent No. 11116202, 1999.

Edlund, David J. and William A. Pledger, "The Practical Use of Metal–Membrane Reactors for Industrial Applications," The 1995 Membrane Technology Reviews, pp. 89–97 (Nov., 1994).

Knapton, A.G., "Palladium Alloys for Hydrogen Diffusion Membranes," Platinum Metals Review, vol. 21, 44–50 (1977).

Minet, R.G., et al., "Experimental Studies of A Ceramic Membrane Reactor for the Steam/Methane Reaction at Moderate Temperatures (400–700°C)," Symposium on Natural Gas Upgrading II Presented before The Division of Petroleum Chemistry, Inc., Meeting of American Chemical Society, San Francisco, California, U.S.A., pp. 245–248 (Apr., 1992).

Oertel, Michael, et al., "Steam Reforming of Natural Gas with Integrated Hydrogen Separation for Hydrogen Production, " Chemical Engineering Technology, vol. 10, pp. 248–255 (1987).

Shu, J., et al., "Catalytic Palladium–Based Membrane Reactors: A Review," The Canadian Journal of Chemical Engineering, vol. 69, pp. 1036–1060 (Oct., 1991).

* cited by examiner

FLUID SEPARATION ASSEMBLY AND FLUID SEPARATION MODULE

CROSS REFERENCE TO RELATED APPLICATIONS

This is a Continuation-In-Part of U.S. patent application Ser. No. 09/422,505, filed Oct. 21, 1999, entitled "Fluid Separation Assembly."

STATEMENT REGARDING FEDERALLY SPONSORED RESEARCH OR DEVELOPMENT

Not Applicable.

BACKGROUND OF THE INVENTION

1. Field of the Invention

The present invention relates to apparatuses and methods for separation of a desired fluid from a fluid mixture. More particularly, the present invention is generally directed to a fluid separation module having several groups of multiple fluid separation assemblies separated by plate members that allows the fluid mixture to pass through the multiple fluid separation assemblies simultaneously.

2. Description of the Invention Background

Generally, when separating a gas from a mixture of gases by diffusion, the gas mixture is typically brought into contact with a nonporous membrane which is selectively permeable to the gas that is desired to be separated from the gas mixture. The desired gas diffuses through the permeable membrane and is separated from the other gas mixture. A pressure differential between opposite sides of the permeable membrane is usually created such that the diffusion process proceeds more effectively, wherein a higher partial pressure of the gas to be separated is maintained on the gas mixture side of the permeable membrane. It is also desireable for the gas mixture and the selectively permeable membrane to be maintained at elevated temperatures to facilitate the separation of the desired gas from the gas mixture. This type of process can be used to separate hydrogen from a gas mixture containing hydrogen. Thus, in this application, the permeable membrane is permeable to hydrogen and is commonly constructed from palladium or a palladium alloy. The exposure to high temperatures and mechanical stresses created by the pressure differential dictates that the permeable membrane be robust. The palladium and palladium alloy of the permeable membrane is the single most expensive component of the fluid separation device, so it is desirable to minimize the amount used in the construction of the fluid separation assemblies while still providing fluid separation assemblies that are strong enough to withstand the mechanical stresses and elevated temperatures of typical operating conditions.

One type of conventional apparatus used for the separation of hydrogen from a gas mixture employs several fluid separation assemblies in a fluid separation module, wherein the fluid separation assemblies are planar disks that are coaxially aligned and stacked in a vertical direction. This type of configuration of the fluid separation assemblies is commonly referred to as being a "series operation." The module has a feed gas inlet, a permeate outlet and a discharge gas outlet. The path of the gas mixture containing hydrogen travels along the outer surface of each of the fluid separation assemblies one at a time, wherein some of the hydrogen of the gas mixture is free to enter the fluid separation assembly by the permeable membranes and is directed to the permeate outlet and the remaining gas mixture serpentines through the passageway contacting each of the remaining fluid separation assemblies one after the other. As the gas mixture travels through the passageway, it contacts the outer surfaces of several other fluid separation assemblies one at a time, wherein more of the hydrogen remaining in the gas mixture permeates the permeable membranes and follows the path resulting in this purified hydrogen passing to the permeate outlet. The remainder of the hydrogen depleted gas mixture exits through the discharge gas outlet located at the opposite end of the module after flowing over the entire stack of fluid separation membrane assemblies. The disadvantage of this type of conventional fluid separation assembly is that the fluid membrane assemblies located at the bottom of the module are not fully utilized. The hydrogen content of the feed gas mixture is depleted to the point where the driving force (i.e., the partial pressure of hydrogen) required to diffuse hydrogen through the permeable membranes of the fluid separation assemblies in the lower portion of the module is very low.

Another conventional fluid separation configuration recycles the hydrogen depleted feed gas mixture. Recycling of the hydrogen depleted feed gas mixture back into the feed stream allows this type of fluid separation configuration to operate like a fully mixed reactor by exposing all of the fluid separation assemblies to a hydrogen feed gas mixture of identical composition. The disadvantage of this type of fluid separation configuration is that it is expensive to recompress the hydrogen feed gas mixture which is necessary to overcome the pressure losses as the hydrogen feed gas mixture moves through the module.

Thus, the need exists for a method and apparatus for inexpensively and effectively separating a desired fluid from a fluid mixture that can reliably withstand high operating pressures and temperatures.

SUMMARY OF THE PRESENT INVENTION

The present invention provides a fluid separation module having groups of multiple fluid separation assemblies that operate in parallel, creating a large permeable membrane surface area for the fluid mixture to pass through. These groups of multiple fluid separation assemblies can then be assembled in a module in varying configurations or numbers depending on the specific application.

The present invention further provides a fluid separation assembly having a thin design that reduces the weight and volume of the fluid separation assembly. This thin design allows the subassemblies to be positioned in close proximity to each other in the module, which increases the packing density of the permeable membrane material (i.e., increases the permeable membrane surface area per unit of total volume of the fluid separation module).

The present invention provides the incorporation of turbulence inducing mechanisms in the feed channel to further increase the turbulence and mixing of the feed stream. These mechanisms may also be used as a support structure for catalytic material. Having a specialized catalytic surface in close proximity to the permeable membrane surface aids the kinetics of secondary chemical reactions to completion as the hydrogen is removed from the feed stream through the permeable membrane.

The present invention provides several feed redistribution plates that direct the feed flow through each group of multiple fluid separation assemblies that operate in parallel thus, reducing the number of components of the fluid separation module.

The present invention provides a mechanical seal on each of the feed redistribution plates to ensure that feed gases pass across the fluid separation assemblies.

The present invention provides a fluid separation assembly having a fluid permeable membrane and a wire mesh membrane support adjacent the fluid permeable membrane, wherein the wire mesh membrane support has an intermetallic diffusion bonding barrier.

The present invention further provides a method for separating a desired fluid from a fluid mixture comprising providing a housing having a wall; providing a first plurality of fluid separation assemblies positioned adjacent one another; providing a second plurality of fluid separation assemblies positioned adjacent one another; positioning a plurality of plates adjacent and between the first and second plurality of fluid separation assemblies; forming a passageway defined by the plates and the housing wall; passing fluid through the passageway and through the first plurality of fluid separation assemblies and through the second plurality of fluid separation assemblies.

Other details, objects and advantages of the present invention will become more apparent with the following description of the present invention.

BRIEF DESCRIPTION OF THE DRAWINGS

For the present invention to be readily understood and practiced, preferred embodiments will be described in conjunction with the following figures wherein:

FIG. 1b is a top plan view of the fluid separation assembly shown in FIG. 1a;

FIG. 2 is an exploded isometric view of the fluid separation assembly of the present invention shown in FIG. 1a;

FIG. 3 is an exploded isometric view of the female permeable membrane subassembly of the present invention shown in FIG. 1a;

FIG. 4 is an exploded isometric view of the male permeable membrane subassembly of the present invention shown in FIG. 1a;

DETAILED DESCRIPTION OF THE INVENTION

The present invention will be described below in terms of apparatuses and methods for separation of hydrogen from a mixture of gases. It should be noted that describing the present invention in terms of a hydrogen separation assembly is for illustrative purposes and the advantages of the present invention may be realized using other structures and technologies that have a need for such apparatuses and methods for separation of a desired fluid from a fluid mixture containing the desired fluid.

It is to be further understood that the figures and descriptions of the present invention have been simplified to illustrate elements that are relevant for a clear understanding of the present invention, while eliminating, for purposes of clarity, other elements and/or descriptions thereof found in a hydrogen separation assembly. Those of ordinary skill in the art will recognize that other elements may be desirable in order to implement the present invention. However, because such elements are well known in the art, and because they do not facilitate a better understanding of the present invention, a discussion of such elements is not provided herein.

Figure 1A:
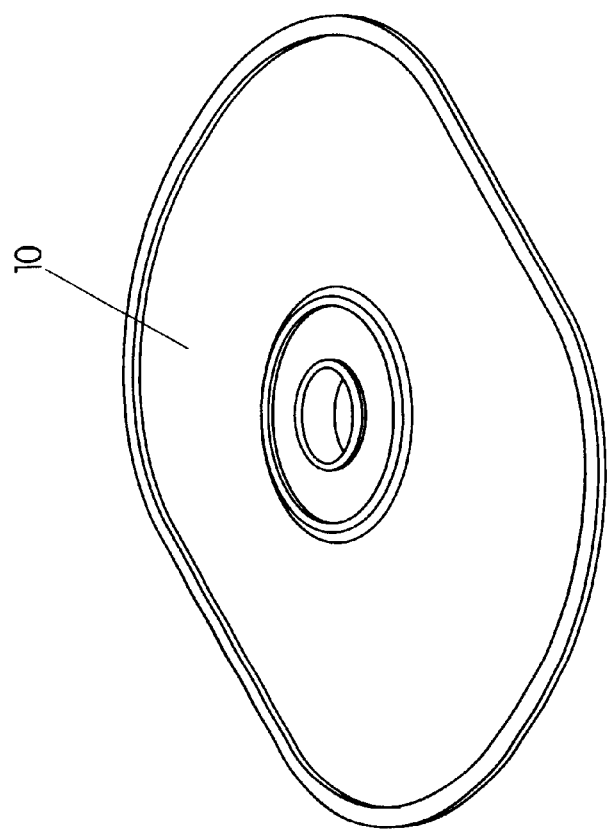
FIG. 1a is an isometric view of the fluid separation assembly of the present invention as assembled.
Figure 1B:
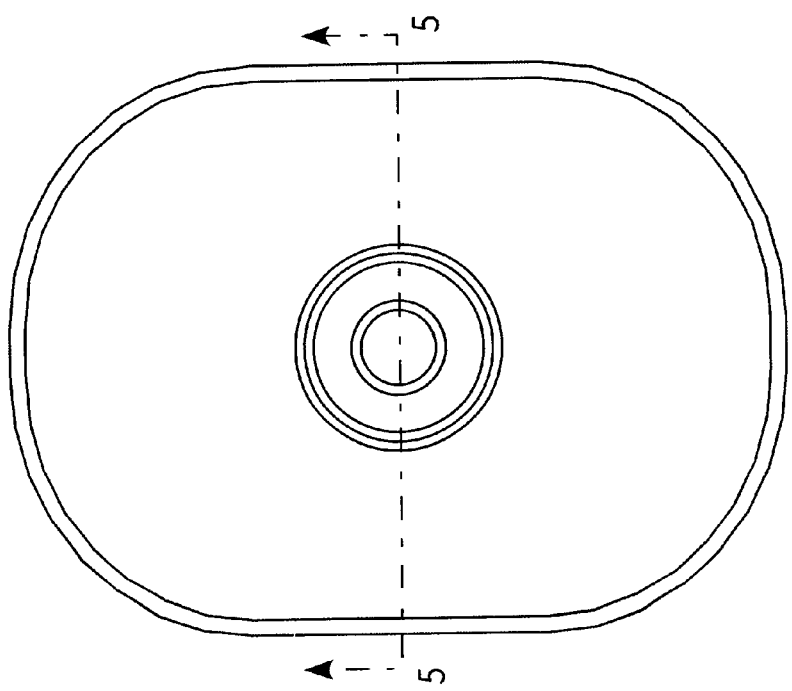
Figure 2:
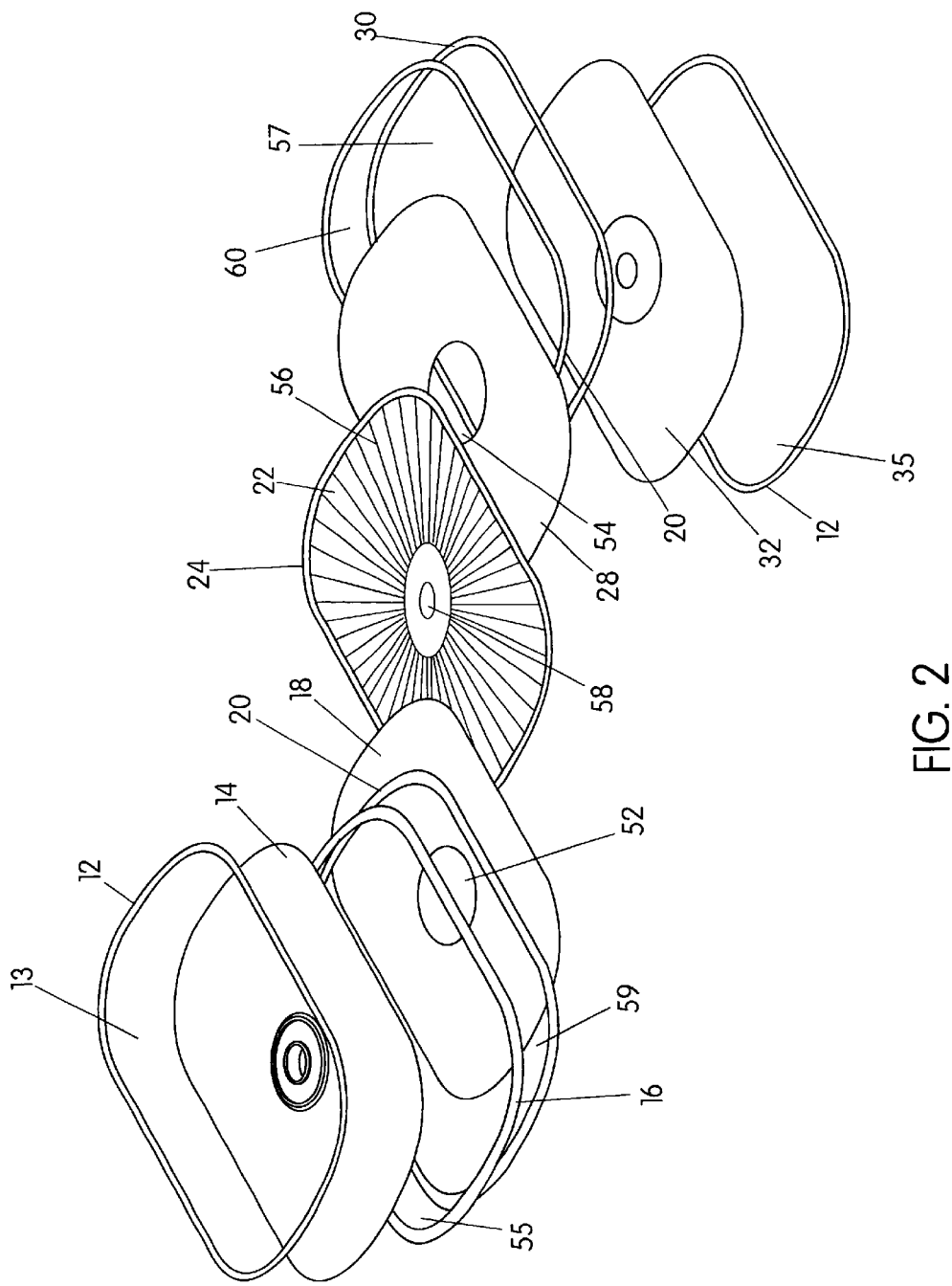

FIGS. 1a, 1b and 2 illustrate one embodiment of the fluid separation assembly 10 of the present invention, wherein FIG. 2 is an exploded view of the fluid separation assembly 10 shown in FIG. 1a. The fluid separation assembly 10 comprises first membrane retainers 12, a female membrane subassembly 14, a first membrane gasket 16, a first wire mesh membrane support 18, second membrane retainers 20, a slotted permeate plate 22, a permeate rim 24, a second wire mesh membrane support 28, a second membrane gasket 30 and a male membrane subassembly 32. In one embodiment, the first retainers 12 may be substantially flat members having four sides wherein two opposing sides are linear and the other two opposing sides are curvilinear such that the periphery corresponds to the peripheries of the female and male membrane subassemblies 14 and 32 and the thickness of the first retainers 12 is between approximately 0.001 inches and 0.060 inches. The first membrane retainers 12 have centrally disposed openings 13 and 35. The first membrane retainers 12 may be made from Monel 400 (UNS N 04400); however, other materials that are compatible with the welding process, discussed below, may also be used. It will also be appreciated that the first retainers 12 may have other desired shapes and other thicknesses than those illustrated without departing from the spirit and scope of the present invention.

Figure 3:
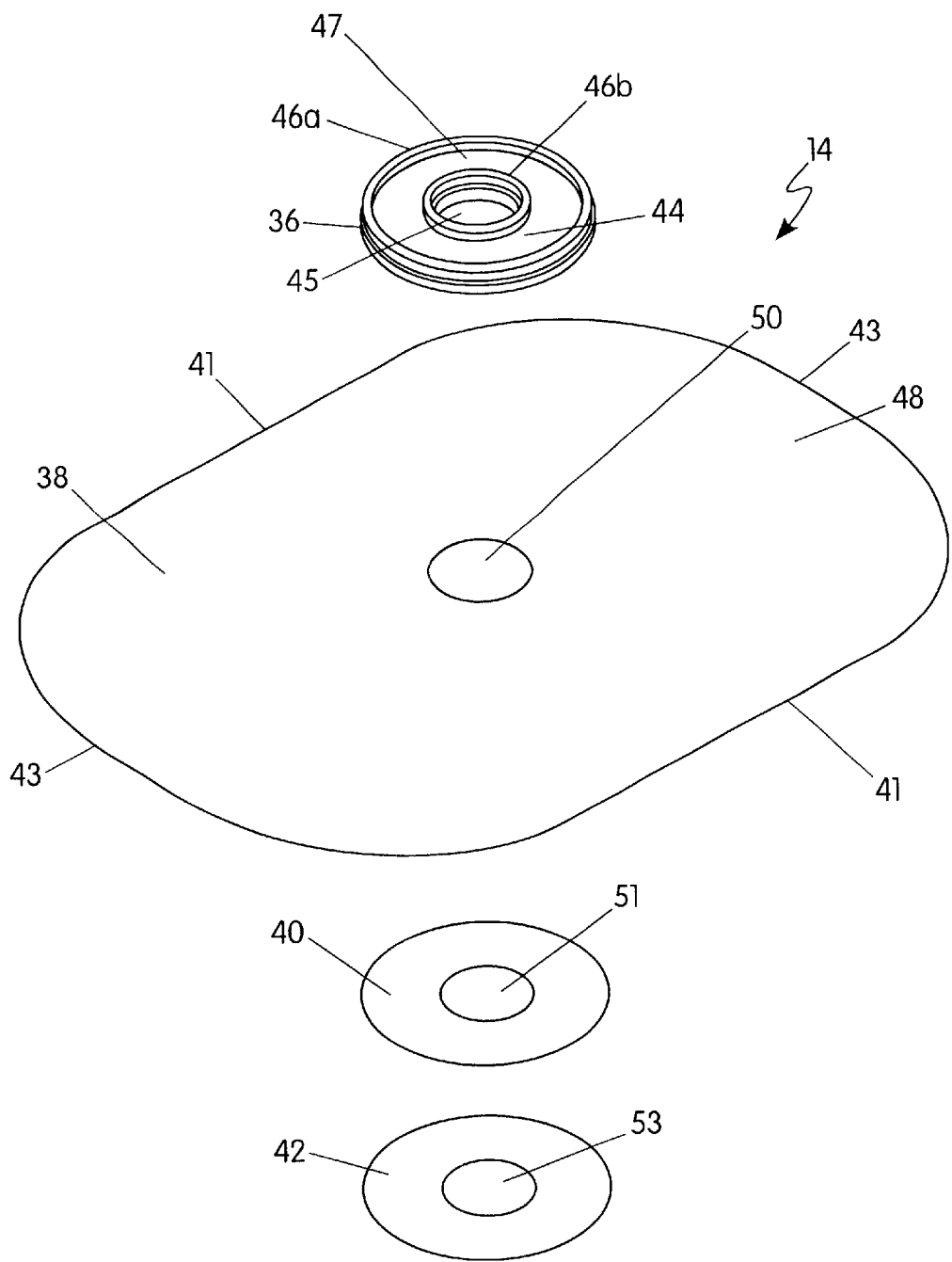

FIG. 3 is an exploded view of the female permeable membrane subassembly 14. In this embodiment, female membrane subassembly 14, comprises a female gasket seat 36, a hydrogen permeable membrane 38, an inner diameter membrane gasket 40 and a center support washer 42. In this embodiment, the female gasket seat 36 is a substantially flat ring member 44 having raised faces 46a and 46b extending around the ring member 44 and a centrally disposed opening 45. The raised faces 46a and 46b are sized and proportioned to form a channel 47 which may accept a gasket 115, discussed below in connection with FIGS. 6–9, such that when the gasket 115 is compressed, it will not extrude and thus, it will be contained within the channel 47. It will be appreciated that there may be other geometries of gasket seats specific to other gasket configurations or materials that may be used without departing from the spirit and the scope of the present invention. The female gasket seat 36 may be made from Monel 400; however, other materials such as nickel, copper, nickel alloys, copper alloys, or other alloys that provide for compatible fusion with the chosen permeable membrane material during welding may be used.

In this embodiment, the hydrogen permeable membrane 38 is a substantially planar member having two opposing sides 41 which are substantially linear, two other opposing sides 43 that are curvilinear, opposing surfaces 48 and a centrally disposed circular opening 50. The inner diameter membrane gasket 40 is a flat ring member having a centrally disposed opening 51. The center support washer 42 is a flat ring member having a centrally disposed opening 53. The inner diameter membrane gasket 40 and the center support washer 42 may be made of Monel 400 (UNS N 04400); however, other materials such as nickel, copper, nickel alloys, copper alloys, or other alloys that provide for compatible fusion with the chosen permeable membrane material or alloy during welding may be used.

Referring back to FIG. 2, in this embodiment, the first and second membrane gaskets 16 and 30 are each a substantially flat member having centrally-disposed openings 55 and 57, respectively. Similar to the first retainers 12 and the hydrogen permeable membrane 38, the first and second membrane gaskets 16 and 30 have four sides, wherein two opposing sides are substantially linear and two other opposing sides are curvilinear. In this embodiment, the first and second membrane gaskets 16 and 30 may be made from Monel 400 alloy (UNS N 004400), nickel, copper, nickel alloys, copper alloys or other precious alloys or other alloys compatible with the weld that is used to join the components of the fluid separation assembly 10 and which is discussed below. The first and second membrane gaskets 16 and 30 may have a thickness of between approximately 0.0005 inches to 0.005 inches. However, other gasket thicknesses could be employed.

Figure 4:
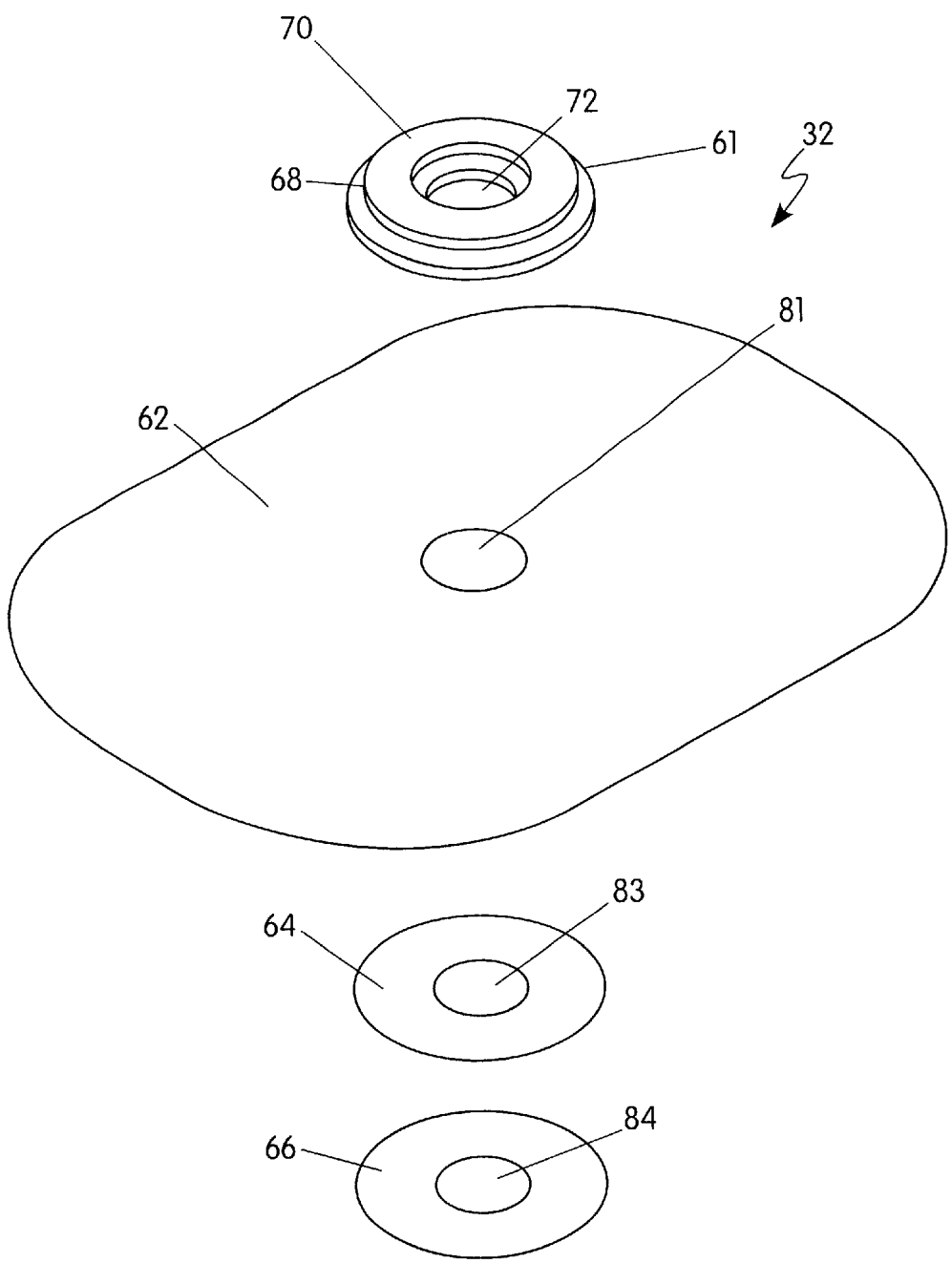

Also in this embodiment, the first and second wire mesh membrane supports 18 and 28 are planar members having centrally disposed openings 52 and 54, respectively. The wire mesh membrane supports 18 and 28 each have four sides, wherein two opposing sides are linear and the other two opposing sides are curvilinear. The wire mesh membrane supports 18 and 28 may be made from 316L stainless steel alloy with a mesh count of between approximately 19 to 1,000 mesh per inch, wherein the mesh count is chosen to be adequate to support the hydrogen permeable membranes 38 and 62 (FIGS. 3 and 4). The style of woven mesh may include a standard plain square weave, twill square weave, rectangular plain or twill weave, or triangular plain or twill weave. One example of a mesh count that may be used is 49 mesh per inch. The wire mesh membrane supports 18 and 28 may be made of steel alloys, stainless steel alloys, nickel alloys or copper alloys. The wire mesh may be coated with a thin film that prevents intermetallic diffusion bonding (i.e., an intermetallic diffusion bonding barrier). The intermetallic diffusion bonding barrier may be a thin film containing at least one of an oxide, a nitride, a boride, a silicide, a carbide, or an aluminide and may be applied using a number of conventional methods, including but not limited to, physical vapor deposition (PVD), chemical vapor disposition, and plasma enhanced vapor deposition. For example, the method of reactive sputtering, a form of PVD, can be used to apply a thin oxide film to the wire mesh membrane supports 18 and 28. A variety of oxides, nitrides, borides, silicides, carbides and aluminides may also be used for the thin film as well as any thin films that will be apparent to those of ordinary skill in the art. Using this form of PVD results in a dense amorphous thin film having approximately the same mechanical strength as the bulk thin film material.

Also in this embodiment, the second membrane retainers 20 each are a substantially flat member. The second membrane retainers 20 have four sides, wherein two opposing sides are substantially linear and the other two opposing sides are curvilinear. One retainer 20 has a centrally disposed opening 59 and the other retainer 20 has a centrally disposed opening 60. See FIG. 2. These retainers 20 may be the same thickness as the first and second wire mesh membrane supports 18 and 28. The second membrane retainers 20 may be made from a material that is compatible with the weld, discussed below, such as Monel 400 (UNS N 004400) and nickel, copper, nickel alloys, copper alloys, precious metals or alloys, or other alloys that provide for compatible fusion with the chosen membrane material or alloy during welding may be used.

In this embodiment, the slotted permeate plate 22 is a steel plate having a plurality of slots 56 extending radially and outwardly from a centrally disposed opening 58 in the direction of the periphery of the slotted permeate plate 22. The number of slots 56 in a slotted permeate plate 22 may range from approximately 10 to 72. However, other suitable slot densities may be employed. The permeate plate rim 24 is a substantially flat member having a centrally disposed opening 63 that receives the slotted permeate plate 22, wherein the opening 63 of the inner periphery is larger than the outer periphery of the slotted permeate plate 22 allowing for a gap at 63 between the slotted permeate plate 22 and the permeate plate rim 24. See FIG. 5. The shape of the slotted permeate plate 22 is similar to the other components of the fluid separation assembly in that it has four sides, wherein two opposing sides are substantially linear and the other two opposing sides are curvilinear. The permeate plate rim 24 is made from Monel 400 (UNS N 04400); however, other materials can also be used such as nickel, copper, nickel alloys, copper alloys, precious metals or alloys or other alloys that provide for compatible fusion with the chosen membrane material or alloy during welding.

FIG. 4 is an exploded view of the male permeable membrane subassembly 32. The male membrane subassembly 32 comprises a male gasket seat 61, a hydrogen permeable membrane 62, an inner diameter membrane gasket 64, and a center support washer 66. The hydrogen permeable membranes 38 and 62 may be made from at least one hydrogen permeable metal or an alloy containing at least one hydrogen permeable metal, preferably selected from the transition metals of groups VIIIA or VIIIB of the periodic table. The hydrogen permeable membrane 62, the inner diameter membrane gasket 64, and the center support washer 66 are similar in structure to the hydrogen permeable membrane 38, the inner diameter membrane gasket 40 and the center support washer 42, respectively, discussed above in connection with FIG. 3. The hydrogen permeable membrane 62 has a centrally disposed opening 81. The male gasket seat 61 is a substantially planar ring member 68 having a circular protuberance 70 extending around a centrally disposed opening 72. In this embodiment, the female gasket seat 36 and the male gasket seat 61 are made of a high strength alloy material that is compatible with the weld such as Monel 400. The inner diameter membrane gaskets 40 and 64 are made from the same materials as the first and second outer diameter membrane gaskets 16 and 30, discussed above.

Figure 5:
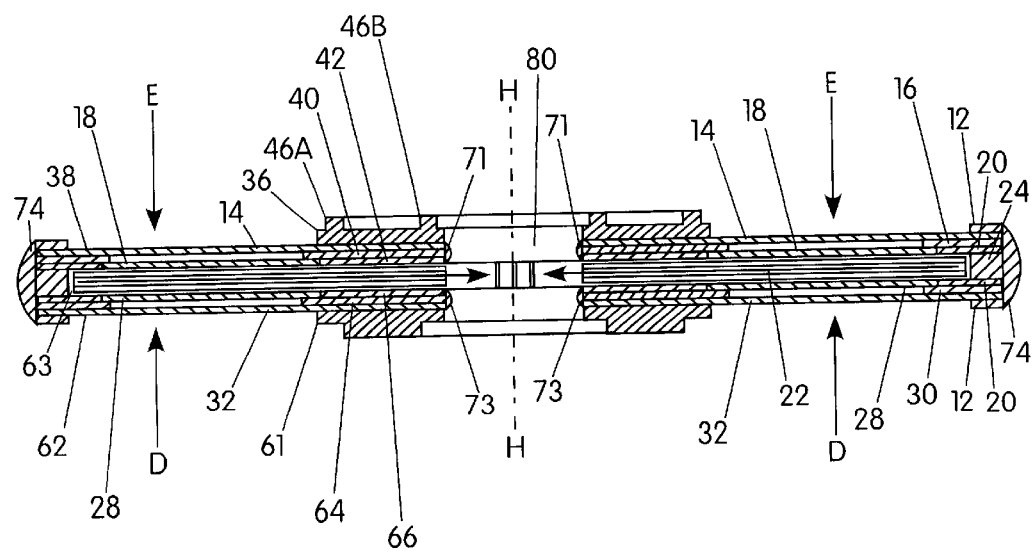
FIG. 5 is a sectional view of the fluid separation assemblies of the present invention shown in FIG. 1b and taken along line 5—5.

FIG. 5 is a cross-sectional view of the assembled fluid separation assembly 10 of the present invention. When assembling the components of the fluid separation assembly 10 shown in FIGS. 2–4, the female membrane subassembly 14 and the male membrane subassembly 32 are initially assembled. The female gasket seat 36 (FIG. 3), the permeable membrane 38, the inner diameter membrane gasket 40 and the center support washer 42 are placed adjacent one another such that their central disposed openings 45, 50, 51 and 53, respectively, are coaxially aligned and form a portion of a conduit 80. A first weld 71 (FIG. 5) is placed at the openings thereof. The first weld 71 takes the form of a weld bead creating a hermetic seal between the female gasket seat 36, the permeable membrane 38, the inner diameter membrane gasket 40 and the center support washer 42. The weld 71 can be effected by a number of commercially available technologies, including but not limited to, laser, electron beam, and tungsten inert gas (TIG) welding. Alternative joining technologies such as brazing or soldering may also be employed with the desired result being a gas tight bond between the gasket seat 36 and the permeable membrane 38. Likewise, the components of the male membrane subassembly 32 (FIG. 4), which include the male gasket seat 61, the permeable membrane 62, the inner diameter membrane gasket 64 and the center support washer 66 are also placed adjacent one another such that their centrally disposed openings 72, 81, 83 and 84 are coaxially aligned with each other forming another portion of conduit 80 and a second weld bead 73 (FIG. 5) is placed around the circumference of the openings 72, 81, 83 and 84 thereof. As stated above, the weld 73 can be effected by a number of commercially available joining technologies, including but not limited to, laser, electron beam, and tungsten inert gas (TIG) welding.

After the components of the female membrane subassembly 14 and the components of the male membrane subassembly 32 have each been connected by the welds 71 and 73, respectively, they are assembled with the other components described above to form the fluid separation assembly 10. As shown in FIG. 2, the first and second retainer members 12 and 20, the female and male membrane subassemblies 14 and 32, the first and second outer diameter gaskets 16 and 30, the first and second wire mesh membrane supports 18 and 28, the slotted permeate plate 22 and the permeate rim 24 are aligned such that their centrally disposed openings are coaxially aligned and form conduit 80. As shown in FIG. 5, these components are retained in that configuration by placing a weld 74 at the outer periphery of the first and second retainer members 12 and 20, the female and male membrane subassemblies 14 and 32, the first and second outer diameter membrane gaskets 16 and 30, and the permeate rim 24. Alternatively, these parts could be assembled such that their centrally disposed openings are coaxially aligned, as shown in FIG. 5, and connected to one another by performing a brazing or soldering operation at the outer periphery of the first and second retainer members 12 and 20, the female and male membrane subassemblies 14 and 32, the first and second outer diameter membrane gaskets 16 and 30 and the permeate rim 24. A space at 63 (FIG. 5) between the slotted permeate plate 22 and the permeate rim 24 permits expansion and contraction of the components of the fluid separation assembly 10 resulting from the change in temperature. Assembled, the fluid separation assembly 10 may have a thickness ranging from 0.010 inches to 0.125 inches, depending upon the thicknesses of the components employed.

Figure 6:
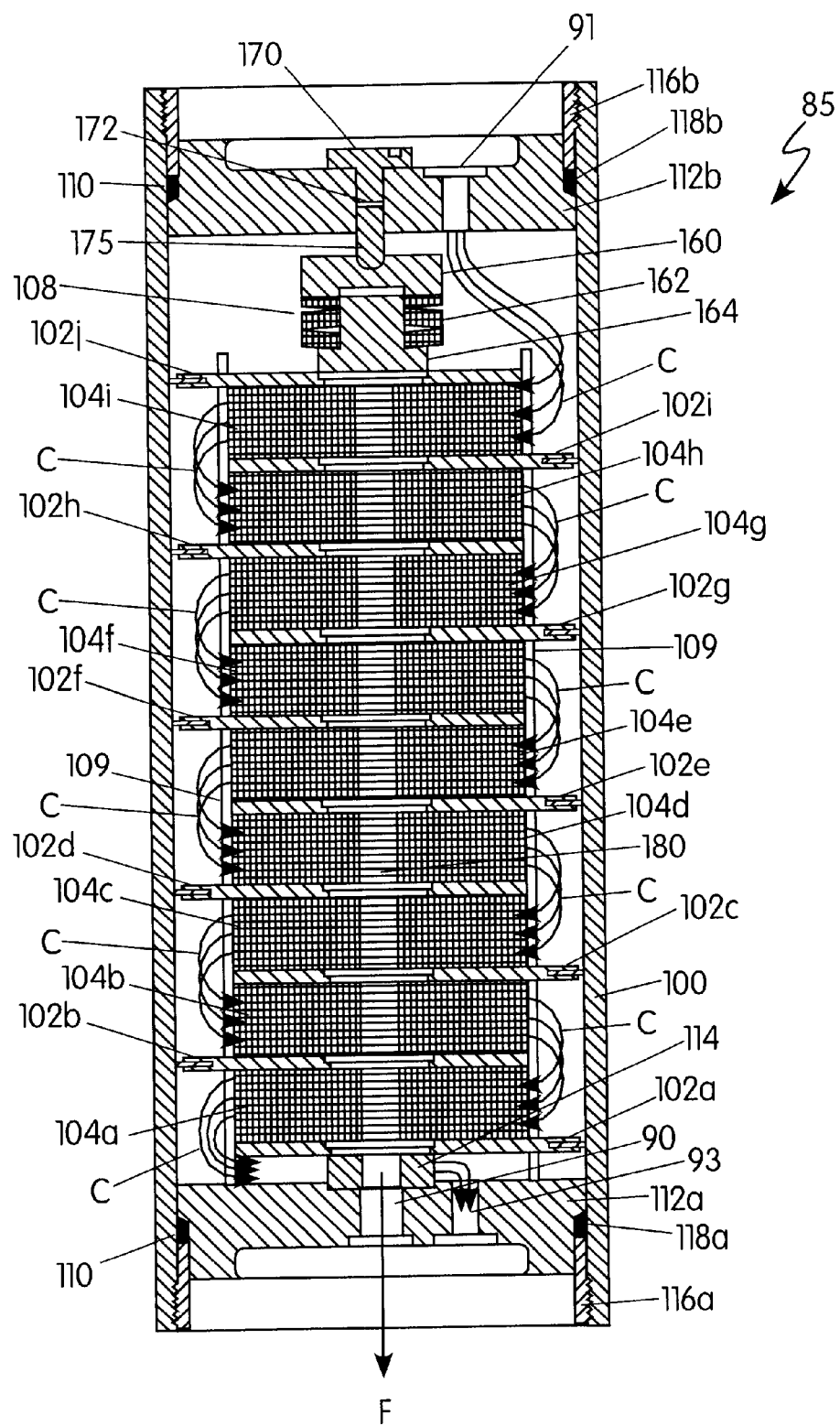
FIG. 6 is a sectional schematic view of a fluid separation module of the present invention having several groups of multiple fluid separation assemblies.
Figure 7:
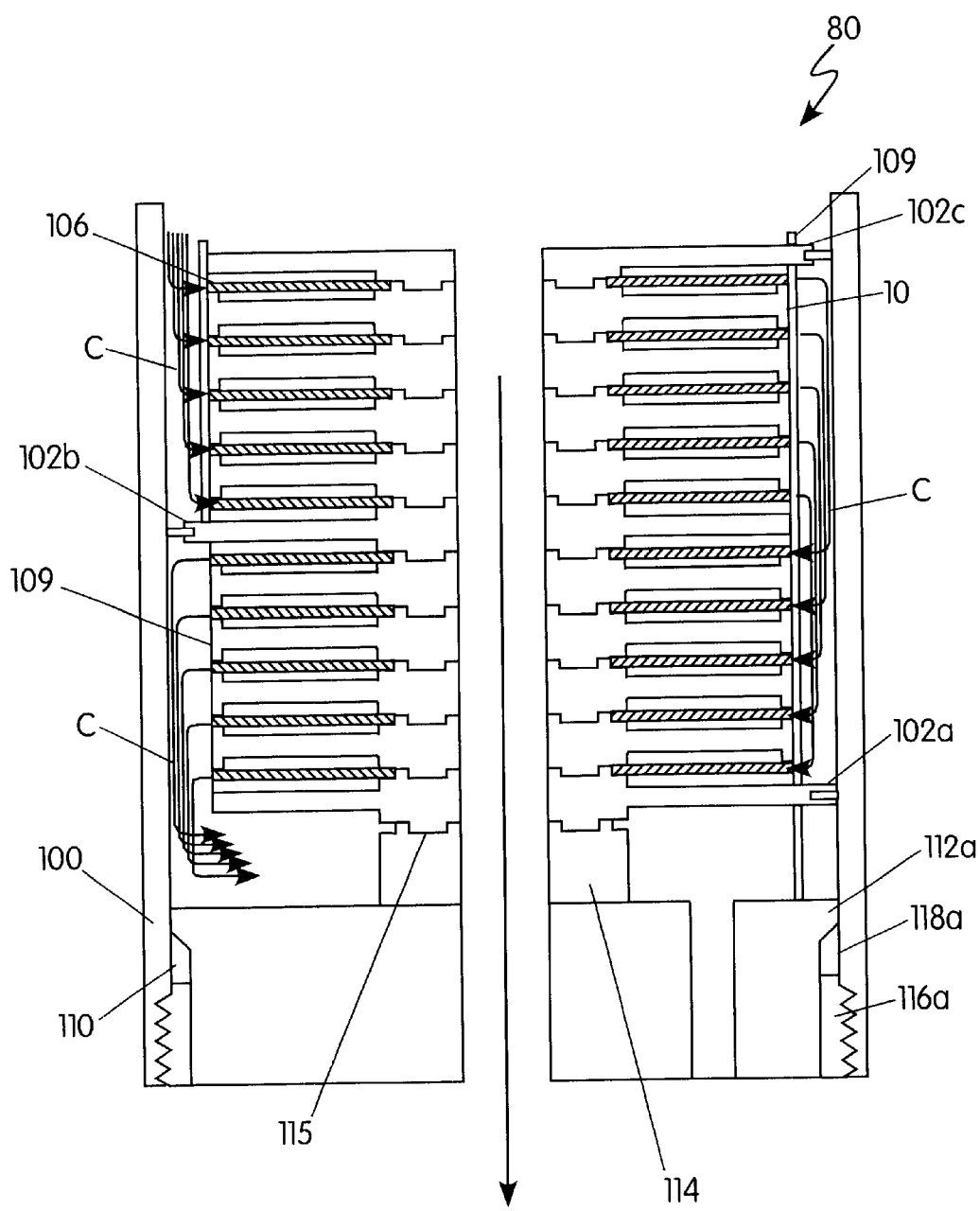
FIG. 7 is an enlarged schematic view of section A of the module shown in FIG. 6.

FIGS. 6 and 7 illustrate a fluid separation module 85 of the present invention employing several groups of multiple fluid separation assemblies 10, wherein FIG. 7 is an enlarged section A of the module 85. For clarity, the number of fluid separation assemblies 10 shown in FIG. 7 has been reduced from ten to four between each successive redistribution plate 102a, 102b, and 102c. To more clearly represent the assembly of the module 85, the fluid separation assemblies 10 are shown in FIG. 7 without the details shown in FIG. 5. The fluid separation module 85 substantially comprises a housing 100, a plurality of feed redistribution plates 102a–102j, several groups of multiple fluid separation assemblies 104a–104i, a plurality of turbulence screens 106, a plurality of guide rods 109, and a compression mechanism 108. The compression mechanism 108 comprises a compression cap 160, high temperature belleville type springs 162 and a spring guide 164. These components of the compression mechanism 108 are standard in the industry. The housing 100 substantially comprises a cylindrical body, a permeate end plug 112a, a feed end plug 112b, compressible gaskets 118a and 118b, a lock ring 116a, a lock ring 116b, a feed gas inlet 91, a permeate outlet 90 and a discharge gas outlet 93. The housing 100 may be made of carbon, alloy, heat and corrosion resistant steels, such as stainless steel or other alloys; however, a variety of metals may also be used, as will be apparent to one of ordinary skill in the art. A variety of conventional module housings can also be employed with the present invention.

Figure 8:
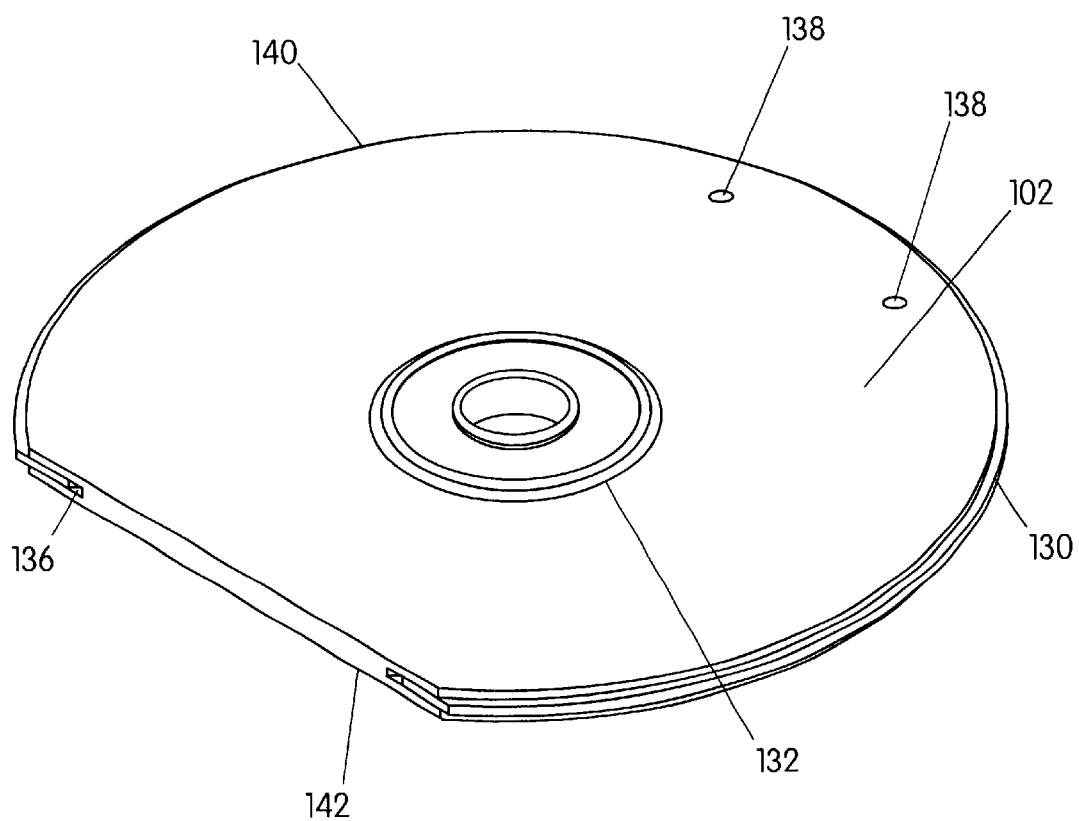
FIG. 8 is an isometric view of a feed redistribution plate of the present invention.

FIG. 8 is an isometric view of a feed redistribution plate 102 of the present invention. The feed redistribution plates 102 each have a curvilinear portion 140, a substantially linear portion 142, a feed redistribution sealing ring 130, and a female gasket member 132 and a male gasket (not shown) which are welded to redistribution plate 102. The feed redistribution sealing ring 130 fits inside the slot 136 and around the curvilinear portion 140 of the feed redistribution plate 102. The male gasket member and female gasket member 132 may take the same form as the male and female gasket members 61 and 36, shown in FIGS. 4 and 3, respectively. The feed redistribution plate 102 also has holes 138 which serve as alignment holes for the guide rods 109 such that the guide rods 109 are received therein to maintain the radial orientation of the redistribution plates 102, and the fluid separation assemblies 10 in the housing 100. The guide rods 109 may be sized and proportioned such that they are received by recesses in the end plug 112a (FIG. 8). The feed redistribution plate 102 may be made from stainless alloy or other suitable high temperature material.

Figure 9:
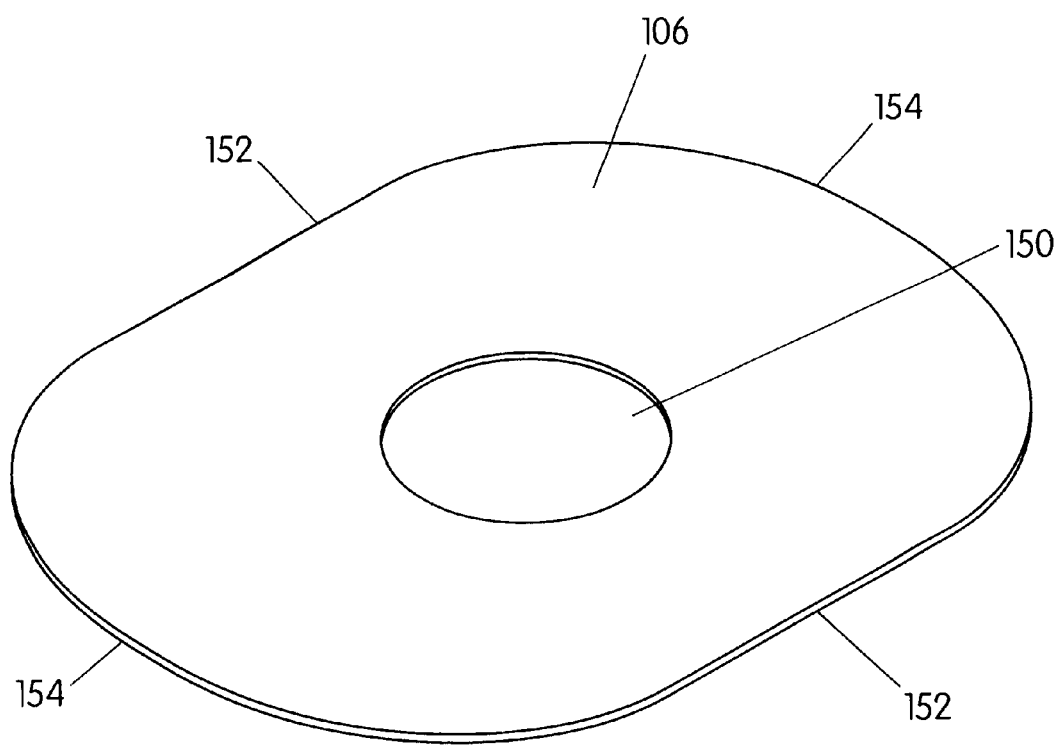
FIG. 9 is an isometric view of a turbulence screen of the present invention.
Figure 10:
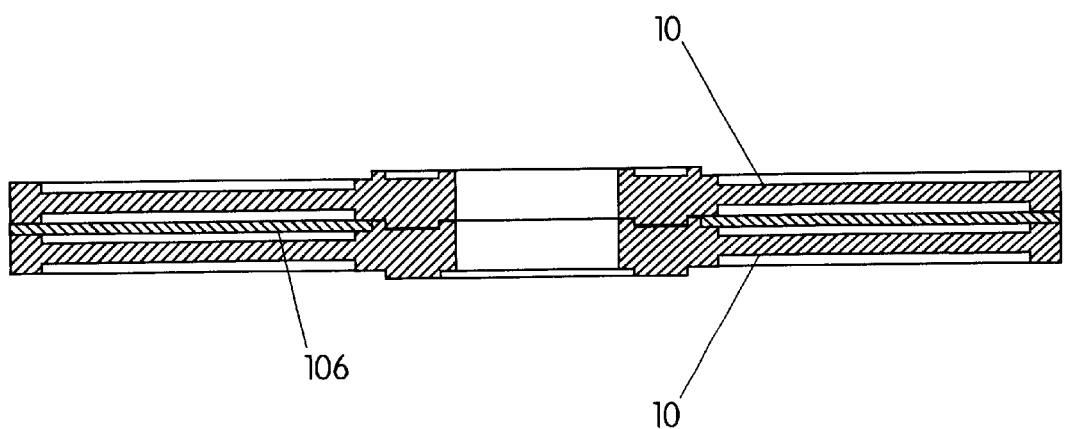
FIG. 10 is a sectional view of multiple fluid separation assemblies and a turbulence screen of the present invention.

FIG. 9 is an isometric view of a turbulence screen 106 of the fluid separation module 85 of the present invention; and FIG. 10 is a sectional view of multiple fluid separation assemblies 10 and a turbulence screen 106 of the present invention. The to turbulence screen 106 has a centrally disposed opening 150 and four sides, wherein two opposing sides 152 are substantially linear and the other two opposing sides 154 are curvilinear. The turbulence screen 106 is a plain woven screen with a thickness substantially the same as the opening of the flow channel between fluid separation assemblies is utilized. Conventional woven mesh may be used for the economic manufacture of the turbulence screens 106, but other materials that promote turbulence could also be selected, such as refractory or high temperature cloths, fibers, mats, felts, or papers. Reticulated ceramics and other types of woven or mat type metal materials (i.e., steel wool) would also serve as a suitable material for the turbulence screen 106. These turbulence screens 106 also may be coated with catalytic material to drive secondary chemical reactions to completion in close proximity to the hydrogen permeable membrane surfaces, without actually contacting the permeable membrane surfaces 48 and 62 and causing damage. The selection of the material and construction should be compatible with the type of catalytic material employed. Catalytic materials may be chosen from a variety of commercially available catalysts. The choice of catalytic material is dependent upon the required operating parameters of the reaction (i.e., pressure, temperature, type and concentration of the constituents in the feed stream) as well as the desired reaction. The catalytic materials could be applied directly to the turbulence screen 106, or indirectly using an intermediate coating material to improve adhesion and prevent spalling of the catalytic material during operation of the module 85. The main criteria for the selection of the material of the turbulence screen 106 is that the material be thermally stable and rigid enough so that it will not deform and possibly damage the permeable membranes 48 and 62.

Referring back to FIGS. 6 and 7, when assembling the fluid separation module 85, the end plug 112a may be welded to the female gasket seat 114. Suitable plumbing fittings (not shown), such as a compression or face seal type, may be welded to the permeate port outlet 90 and discharge outlet port 93. A pliable high-temperature gasket 118a is then installed onto the end plug 112a. The gasket 118a may be a molded or pressed unitary flat wound material, a rectangular or square cross-sectional woven or non-woven packing material, or a multiple cut ring of sheet-type gasket material that is fitted onto the shoulder of the end plug 112a to create a compression-type seal. Other types of mechanical seals, such as metal o-rings, metal c-section seals, or soft metal seals, may also be used.

After the gasket 118a is in place, the end plug 112a is inserted into the module body 110 and a threaded lock ring 116a is screwed into the end of the module housing 100. The module 85 is then placed into a press (not shown) and a mechanical force is applied to the end plug 112a forcing it down against the lock ring 116a thus, compressing the gasket 118a and forcing the gasket 118a in an outward radial direction against the wall 110 of the module 85, creating a seal.

One feed redistribution plate 102a is inserted into the housing 100 adjacent the female seat 114. The sealing ring 130 of the feed redistribution plate 102a is compressed and forms a fluid tight seal with the housing 100. The grooves 136 cut into the outer periphery of the redistribution plates 102 allow the sealing rings 130 to be compressed. Once the redistribution plates 102 are lowered into the housing 100, the compression on the sealing rings 130 are released, allowing them to contact the wall 110 of the housing 100. The male gasket seat on the underneath sides of the redistribution plates 102 are in contact with a fibrous gasket 115 (FIG. 7) that is received within the female gasket seat 114. It will be appreciated that other mechanical seals employing different geometries and different materials may be used to effect a fluid-tight seal.

After the redistribution plate 102a is in place, a plurality of the fluid separation assemblies 104a and turbulence screens 106 positioned between each of the fluid separation assemblies 104a may then be assembled into the module 85. The guide rods 109 are inserted into the holes 138 of the redistribution plate 102a. The centrally disposed openings of each of the turbulence screens 106, the fluid separation assemblies 10 and the feed redistribution plates 102 are coaxially aligned. The turbulence screens 106 are added between each pair of fluid separation assemblies 10 to promote turbulent flow of the feed gases and insure that hydrogen rich feed gas is continuously fed to the membrane surface. The turbulence screens 106, shown in FIGS. 6, 7 and 9, contact the planar surfaces of the female gasket seat 44 (FIG. 5) and the male gasket seat 68 when the module 85 (FIG. 6) is constructed. The turbulence screens 106 are held in place by the first membrane retainers 12 of the fluid separation assemblies 10 that are adjacent to each turbulence screen 106. A turbulence screen 106 is positioned between fluid separation assemblies 10, as shown in FIG. 10, when the fluid separation assemblies 10 are stacked adjacent to one another to create groups of multiple fluid separation assemblies 104a–104i (FIGS. 6 and 7).

The turbulence screens 106 also serve as a substrate for the application of reaction catalysts that will prompt a secondary reaction adjacent to the permeable membrane surfaces 48 and 62. One example of a catalytic material that may be used for methanol steam reforming or water-gas shift reactions is a material comprised of Cu/ZnO/Al2O3, wherein the desired reaction to take place would be dependent upon the operating parameters employed. When a hydrogen producing reaction is carried out in this manner, the reaction kinetics are driven to completion by the continuous removal of hydrogen from the feed stream by the hydrogen permeable membranes 48 and 62. An example of this type of reaction is the water-gas shift reaction, which is denoted as:

$$H_2O_{vapor} + CO \leftrightharpoons H_2 + CO_2$$

As the water vapor and carbon monoxide react to form hydrogen and carbon dioxide in the presence of a suitable catalyst, hydrogen is continually being removed by the hydrogen permeable membranes 48 and 62 thus, allowing a substantially complete reaction. This type of reaction is common in hydrogen rich reformate streams, where both water vapor and carbon monoxide are present. Catalytic materials may be chosen from a variety of commercially developed catalysts, wherein the selection of the catalytic material would be dependent upon the required operating parameters of the reaction (i.e., pressure, temperature, type and concentration of the constituents in the feed stream) as well as the desired reaction to take place. The catalytic materials may be applied directly to the turbulence screen 106, or indirectly using an intermediate coating material to improve adhesion and prevent spalling of the catalytic material during operation.

The redistribution plates 102 are positioned on the female and male gasket seats 36 and 61 in such a manner that they are positioned equidistant from the planar surface of the permeable membrane assemblies 14 and 32 in successive fluid separation assemblies 10. The redistribution plates 102 are not fixedly connected to the gasket seats 36 and 61, but rather are received by the channel 47 of the female gasket seat 36 and the raised face 70 of the male gasket seat 61. There is sufficient clearance between slot 136 and the sealing ring 130 of the redistribution plate 102 such that the redistribution plate 102 and the fluid separation assemblies 10 are positioned inside the wall 110 of the housing 100 independently of the position of the fluid separation assemblies 10. Each redistribution plate 102 has opening 89 therein.

Several groups of multiple fluid separation assemblies 104b–104i (FIG. 6) are stacked within the module 85, wherein the feed redistribution plates 102b–102j separate the groups of fluid separation assemblies 104b–104i and turbulence screens 106 separate successive fluid separation assemblies 10. The fluid separation assemblies 10 are aligned one with the other such that each of the conduits 80 (FIG. 5) of the fluid separation assemblies 10 form a portion of channel 180. The assembly of the module 85 continues by alternatively stacking a gasket 115, multiple fluid separation assemblies 104 having turbulence screens 106 positioned between successive fluid separation assemblies 10, and feed redistribution plates 102 until the desired number of groups of multiple fluid separation assemblies 104 have been stacked in the module 85. Please note that the redistribution plate 102b is assembled in the same way as the redistribution plate 102a, with the exception that it is rotated 180 degrees relative to the first redistribution plate 102a. This alternating orientation of the redistribution plates 102 along the stack of fluid separation assemblies 104a–104i creates a fluid passageway C (FIG. 7) that directs the feed gas over each group of fluid separation assemblies 10. It should also be noted that the number of fluid separation assemblies 10 in the multiple fluid separation assemblies 104a–104i may be assembled in different quantities. In this embodiment, equal numbers of fluid separation assemblies 10 comprising the multiple fluid separation assemblies 104 have been placed between each successive redistribution plate 102 for purposes of illustration only. The number of fluid separation assemblies 10 between each successive redistribution plate 102 may be reduced or increased to optimize the performance of the fluid separation assemblies 10 at each successive stage in the module 85. Altering the number of fluid separation assemblies 10, and thus the total permeable membrane area between each successive redistribution plate 102, allows the overall performance of the hydrogen separation module 85 to be maximized with respect to the total permeable membrane area required for a given fluid separation application. For example, a larger number of fluid separation assemblies 10 may be positioned together at the feed end of the module 85, where the feed stock gas is highest in hydrogen content and a reduced number of fluid separation assemblies 10 may be positioned at the raffinate end of the module 85, where the hydrogen depleted feed gas exits.

When the last redistribution plate 102j is assembled in the module 85, the compression mechanism 108 is placed on the redistribution plate 102j. The belleville springs 162 are sized such that at full compression, supplies a compressive load sufficient to maintain a positive sealing force on the gaskets 115 positioned between the fluid separation assemblies 104a–104i in the module 85. When the gaskets 115 are compressed, they also provide a small amount of give to compensate for the different coefficients of thermal expansion inherent to the different materials used in the module 85. As the module 85 thermally cycles between ambient and operating temperatures, the components within the module 85 are able to expand and contract. This small amount of give also helps compensate for any additional compression of the gaskets 118a and 118b that may occur over time.

With the compression mechanism 108 in place, the end plug 112b is fitted with a gasket 118b identical to the gasket 118a, and is lowered into the module 85. A suitable plumbing fitting (not shown), such as a compression or face seal type fitting is welded into the inlet port 91. The lock ring 116b is then screwed into the module 85 to a point where it is flush with the end of the housing 100. A setscrew 175 is inserted into the threaded compression screw hole 172. As this setscrew 175 is tightened, it contacts the compression cap 160 and forces the end plug 112b upwards against the lock ring 116b. This results in the gasket 118b being forced outwardly in a radial direction against the wall 110, thus creating a fluid-tight seal. At the same time that the end plug 112b is being forced upwards, the setscrew 175 is compressing the belleville springs 162 and thus, maintaining a compressive force on the gaskets 115 within the module 85. After the setscrew 175 has been tightened to the required torque necessary for fully compressing the belleville springs 162, a sealing gasket (not shown) is placed in the recess surrounding the threaded screw hole 172. The cap 170 is then screwed into the hole 172 and tightened to create a positive seal with the sealing gasket positioned in the recess surrounding the hole 172 and the end plug 112b.

During operation, the hydrogen rich feed gas is admitted into the inlet port 91 and travels in a serpentine fashion through passageway C in the module 85 where the feed gas encounters multiple fluid separation assemblies 104a–104i. Specifically, pure hydrogen is first diffused through the permeable membrane of each fluid separation assembly 10 comprising multiple fluid separation assemblies 104i and is collected in a central permeate channel 180. The permeate hydrogen exits the module 85 through the permeate outlet 90, while the hydrogen depleted mixture exits through the discharge outlet 93. Referring to FIG. 5, when separating the hydrogen from the feed gas that includes hydrogen, the feed gas is directed towards the permeable membranes 38 and 62 of the female membrane subassembly 14 and the male membrane subassembly 32, respectively, in the directions D and E. When the feed gas containing hydrogen contacts the hydrogen permeable membranes 38 and 62, the hydrogen permeates through the permeable membranes 38 and 62, passes through the first and second wire mesh membrane supports 18 and 28 and enters the slotted permeate plate 22 where the hydrogen enters slots 56 and is directed toward the central axis H by the passageways formed by the slots 56. The central openings of the components of the fluid separation assembly 10 form the conduit 80, which forms a portion of the channel 180 such that the purified hydrogen is collected and transported to the permeate outlet 90. The conduit 80 may have a diameter of between approximately 0.25 inches and 1 inch. The diameter is determined by the components of the fluid separation assembly 10 and by the desire that the hydrogen flow be substantially unimpeded. The non-hydrogen gases in the gas mixture are prevented from entering the fluid separation assembly 10 by the fluid permeable membranes 38 and 62. The remainder of the hydrogen depleted feed gas is directed around the exterior of the fluid separation assembly 10 and continues along the passageway C to the next set of multiple fluid separation assemblies 104h, 104g, 104f, 104e, 104d, 104c, 104b and 104a.

Although the present invention has been described in conjunction with the above described embodiment thereof, it is expected that many modifications and variations will be developed. This disclosure and the following claims are intended to cover all such modifications and variations.

What is claimed is:

1. A method for separating a desired fluid from a fluid mixture, comprising:

a) providing a housing having a wall;

b) providing a first plurality of fluid separation assemblies positioned adjacent one another;

c) providing a second plurality of fluid separation assemblies positioned adjacent one another;

d) positioning a plurality of plates adjacent and between said first and second plurality of fluid separation assemblies, thereby forming a passageway defined by said plates and said housing wall; and e) passing fluid through said passageway and through said first plurality of fluid separation assemblies and through said second plurality of fluid separation assemblies, wherein each fluid separation assembly of said first and second plurality of fluid separation assembly comprises a fluid permeable membrane having a centrally disposed opening and a wire mesh membrane adjacent said fluid permeable membrane, said wire mesh membrane having an intermetallic diffusion barrier.

2. A method for separating a desired fluid from a fluid mixture, comprising:

a) providing a housing having a wall;

b) providing a first plurality of fluid separation assemblies positioned adjacent one another;

c) providing a second plurality of fluid separation assemblies positioned adjacent one another;

d) positioning a plurality of plates adjacent and between said first and second plurality of fluid separation assemblies, thereby forming a passageway defined by said plates and said housing wall; and e) passing fluid through said passageway and through said first plurality of fluid separation assemblies and through said second plurality of fluid separation assemblees, wherein said fluid separation assemblies of said first and second pluralities of fluid separation assemblies comprise:
  i) a permeate plate having a first surface, a second surface, a fluid outlet and fluid passageways extending from said first surface and said second surface to said fluid outlet;
  ii) first and second wire mesh membranes adjacent said first surface and said second surface of said permeate plate, respectively, each of said first and second wire mesh membranes comprising a wire mesh having a coating that is an intermetallic diffusion bonding barrier and having an opening aligned with said fluid outlet of said permeate plate; and
  iii) first and second fluid permeable membranes, said first fluid permeable membrane adjacent a surface of said first wire mesh membrane opposite said permeate plate, said second fluid permeable membrane adjacent a surface of said second wire mesh membrane opposite said permeate plate, each of said first and second permeable membranes having an opening aligned with said fluid outlet.

3. A fluid separation module, comprising:
a housing having a wall;
a first plurality of fluid separation assemblies within said housing, each of said first plurality of fluid separation assemblies are adjacent one another;
a second plurality of fluid separation assemblies within said housing, each of said second plurality of fluid separation assemblies are adjacent one another;
a plurality of plates within said housing, said plurality of plates positioned between and separating said first plurality of fluid separation assemblies from said second plurality of fluid separation assemblies; and
a fluid passageway defined by said plurality of plates and said housing wall,
wherein each fluid separation assembly comprises a first fluid permeable membrane having a centrally disposed opening and a first wire mesh membrane adjacent said first fluid permeable membrane, said first wire mesh membrane having an intermetallic diffusion barrier.

4. The fluid separation module of claim 3, wherein said first wire mesh membrane has a centrally disposed opening which is in alignment with said first fluid permeable membrane opening.

5. The fluid separation module of claim 4, wherein the opening of the wire mesh membrane and the opening of said fluid permeable membrane are coaxially aligned.

6. The fluid separation module according to claim 3, wherein said barrier is a thin film containing at least one of the group consisting of nitrides, oxides, borides, silicides, carbides and aluminides.

7. The fluid separation module according to claim 3, wherein said barrier is a thin film containing one of an oxide and a nitride.

8. The fluid separation module according to claim 3, wherein said first wire mesh membrane has a mesh count ranging between approximately 19 to 1000 mesh per inch.

9. The fluid separation module according to claim 3, further comprising a slotted permeate plate adjacent to said first wire mesh membrane.

10. The fluid separation module according to claim 3, said fluid separation assemblies further comprising:
  a. a permeate plate having a first surface, a second surface, a centrally disposed fluid outlet and fluid passageways extending from said first surface and said second surface to said fluid outlet;
  b. a second wire mesh membrane adjacent said second surface of said permeate plate, said second wire mesh membrane comprising a wire mesh having a coating that is an intermetallic diffusion bonding barrier and having an opening aligned with said fluid outlet of said permeate plate, and wherein said first wire mesh membrane is adjacent said first surface of said permeate plate; and
  c. a second fluid permeable membrane adjacent a surface of said second wire mesh membrane opposite said permeate plate, wherein said first fluid permeable membrane is adjacent a surface of said first wire mesh membrane opposite said permeate plate, each of said first and second permeable membranes having an opening aligned with said fluid outlet.

11. The fluid separation module according to claim 10, wherein said permeate plate, said second wire mesh membrane and said second fluid permeable membrane each also have a centrally disposed opening and each of said centrally disposed openings are coaxially aligned and form a central conduit.

12. The fluid separation module according to claim 10, wherein each of said fluid permeable membranes further comprises a gasket seat, a membrane gasket, and a washer to form first and second membrane subassembly, wherein said gasket seats, said membrane gaskets and said washers are connected to said fluid permeable membranes.

13. The fluid separation module according to claim 12, further comprising a weld bead connected to each of said first and second membrane subassemblies.

14. The fluid separation module according to claim 13, further comprising first retainers, one of said first retainers connected to each of said fluid permeable membranes.

15. The fluid separation module according to claim 14, further comprising second retainers adjacent said permeate plate.

16. The fluid separation module according to claim 13, further comprising first retainers and second retainers, wherein said first retainers and said second retainers are adjacent each of said fluid permeable membranes.

17. The fluid separation module according to claim 13, further comprising gaskets, one of said gaskets adjacent each of said wire mesh membranes.

18. The fluid separation module according to claim 3, wherein said first wire mesh membrane is made from stainless steel.

19. The fluid separation module according to claim 3, wherein said plurality of plates are a substantially planar member having a gasket connected at the periphery of said plate.

20. The fluid separation module according to claim 19, wherein each of said plurality of plates has a groove extending around a portion of the periphery of each of said plurality of plates, and said gasket is received within said grooves.

21. The fluid separation module according to claim 3, wherein said plurality of plates have a curved portion and a linear portion.

22. The fluid separation module according to claim 3, wherein said housing is substantially cylindrical and said plurality of plates has a surface area that is less than a cross-sectional area of said housing.

23. The fluid separation module according to claim 3, wherein each of said plurality of plates defines a plurality of holes therethrough.

24. The fluid separation module according to claim 23, further comprising a plurality of guide rods that are received by said holes.

25. The fluid separation module according to claim 23, wherein each of said plurality of plates has first and second gaskets connected thereto.

26. The fluid separation module according to claim 25, wherein said first and second gaskets have male and female connectors, respectively.

27. The fluid separation module of claim 3, wherein the first wire mesh membrane and the first fluid permeable membranes are substantially planar.

28. The fluid separation module according to claim 3, further comprising one or more additional pluralities of fluid separation assemblies within said housing, said fluid separation assemblies of each of said additional pluralities of fluid separation assemblies being adjacent each other.

29. A fluid separation module, comprising:
  a housing having a wall;
  a first plurality of fluid separation assemblies within said housing, each of said first plurality of fluid separation assemblies are adjacent one another;
  a second plurality of fluid separation assemblies within said housing, each of said second plurality of fluid separation assemblies are adjacent one another;
  a plurality of plates within said housing, said plurality of plates positioned between and separating said first plurality of fluid separation assemblies from said second plurality of fluid separation assemblies; and
  a fluid passageway defined by said plurality of plates and said housing wall;
  said fluid separation assemblies comprising:
    a. a permeate plate having a first surface, a second surface, a fluid outlet and fluid passageways extending from said first surface and said second surface to said fluid outlet;
    b. first and second wire mesh membranes adjacent said first surface and said second surface of said permeate plate, respectively, each of said first and second wire mesh membranes comprising a wire mesh having a coating that is an intermetallic diffusion bonding barrier and having an opening aligned with said fluid outlet of said permeate plate; and
    c. first and second fluid permeable membranes, said first fluid permeable membrane adjacent a surface of said first wire mesh membrane opposite said permeate plate, said second fluid permeable membrane adjacent a surface of said second wire mesh membrane opposite said permeate plate, each of said first and second permeable membranes having an opening aligned with said fluid outlet.

30. The fluid separation assembly of claim 29, wherein said openings of said fluid permeable membranes and said wire mesh membranes and said outlet of said permeate plate are centrally disposed and coaxially aligned to form a central conduit.

31. The fluid separation assembly of claim 30, wherein said fluid permeable membranes, said wire mesh membranes and said permeate plate are substantially flat and ring-shaped said permeate plate includes slots defining said fluid passageways, and said slots are radially disposed.

32. The fluid separation assembly of claim 29, further comprising a hermetic seal peripheral to said fluid permeable membranes, said wire mesh membranes, and said permeate plate.

33. The fluid separation assembly of claim 32, wherein each of said fluid permeable membranes further comprises a gasket seat, a membrane gasket, and a washer disposed about said opening to form a first and second membrane subassembly, wherein said gasket seats, said membrane gaskets and said washers are connected to said fluid permeable membranes.

34. The fluid separation assembly of claim 33, wherein said hermetic seal comprises a weld bead connected to each of said first and second membrane subassemblies.

35. The fluid separation assembly of claim 29, further comprising first retainers, one of said first retainers connected to each of said fluid permeable membranes.

36. The fluid separation assembly of claim 35, further comprising second retainers adjacent said permeate plate.

37. The fluid separation assembly of claim 29, further comprising first retainers, one of said first retainers adjacent each of said fluid permeable membranes.

38. The fluid separation assembly of claim 29, further comprising gaskets, one of said gaskets adjacent each of said first and second wire mesh membranes.

39. The fluid separation assembly of claim 29, wherein said fluid permeable membranes are selectively permeable to hydrogen.

40. The fluid separation assembly of claim 29, wherein said fluid permeable membranes comprise palladium or a palladium alloy.

41. The fluid separation assembly of claim 29, wherein said wire mesh membranes comprise stainless steel.

42. The fluid separation assembly of claim 29, wherein the intermetallic diffusion bonding barrier contains a compound selected from the group consisting of oxides, nitrides, borides, silicides, carbides and aluminides.

43. The fluid separation assembly of claim 29, wherein the intermetallic diffusion bonding barrier contains one of an oxide and a nitride.

* * * * *